United States Patent [19]

Goltz et al.

[11] 3,864,175

[45] Feb. 4, 1975

[54] CHROMATE RINSE FOR PHOSPHATE COATED METALS AND METAL PRODUCTS

[75] Inventors: Kurt Goltz, Exton; Willaim Adrian Blum, Fort Washington, both of Pa.

[73] Assignee: Pennwalt Corporation, Philadelphia, Pa.

[22] Filed: Apr. 25, 1973

[21] Appl. No.: 354,401

[52] U.S. Cl. ............................ 148/6.2, 148/6.16
[51] Int. Cl. .......................... C23c 1/10, C23f 7/24
[58] Field of Search ................... 148/6.16, 6.2

[56] References Cited
UNITED STATES PATENTS

| | | | |
|---|---|---|---|
| 2,564,864 | 8/1951 | Thompson | 148/6.16 |
| 2,605,217 | 7/1952 | Freud | 148/6.2 X |
| 3,565,699 | 2/1971 | Plaxton | 148/6.16 |
| 3,664,887 | 5/1972 | Atkiss | 148/6.16 |

*Primary Examiner*—John D. Welsh
*Attorney, Agent, or Firm*—Robert G. Danehower

[57] ABSTRACT

This invention provides a new sealing rinse and process for its application to phosphate coated metals to seal against porosity and to promote the adhesion of subsequent paint coatings. The new sealing rinse is an aluminum polymer prepared by adding aluminum hydroxide dried gel to hot chromic acid. In the application of the sealing rinse, steel, galvanized steel, aluminum and zinc are given a phosphate coating and then wetted with an aqueous solution of the aluminum polymer.

17 Claims, No Drawings

CHROMATE RINSE FOR PHOSPHATE COATED METALS AND METAL PRODUCTS

BACKGROUND OF THE INVENTION

Phosphate coatings on metals are widely known as useful adhesion promotoers for paint, varnish, lacquer and the like, and their application is one of the standard procedures of the metal finishing industry. Beside adhesion, the phosphate coatings also provide some protection against under-paint corrosion, but normally not enough. It was found long ago that the under-paint corrosion protection of phosphate coatings is greatly enhanced when the phosphate coated metal is wetted with a dilute acid chromate rinse solution prior to paint application, and almost every proprietary phosphate coating process specifies these chromate rinces which are also called sealing rinses or chromate seals.

Since chromates are toxic to animal life, depleted chromate solutions must now be treated before they can be discharged into streams or waste systems to render them non-toxic.

A major short-coming of the chromate rinse is that uneven accumulations of the chromate rinse, when dried on the metal surface, cause blister-type failures of the painted surfaces. Water rinsing alleviates the blistering but removes most of the chromate coating.

Chromi-chromates, trivalent chromium rinses as shown in U.S. Pat. Nos. 3,222,226 and 3,279,958 are claimed to be more resistant to rinsing with water since they are believed to be chemically attached to the phosphated surface. However, these chromi-chromates suffer from being chemically unstable in the application bath leading to high chemical losses because of excessive dumping.

The chromate rinse which is the subject of this invention is chemically stable in the application bath and is not adversely affected by drag in of acid or alkali in moderate amounts. It also has the advantage that it becomes chemically attached to the phosphate coating and is not removed to any great extent in the event that a water rinse of the sealing coat is needed or desired.

BRIEF DESCRIPTION OF INVENTION

We have now discovered that acid solutions of aluminum chromate polymer when used to wet the surface of phosphate coated metals such as steal, galvanized steel, zinc and aluminum are effective sealing agents for the phosphate coated metal. The aluminum chromate polymers in acidic aqueous solution perform as good or better than the conventional chromic acid rinse. Moreover, the performance is as good as the prior art chromi-chromate rinse with the added advantage that the aluminum chromate polymer rinse baths have a long period of chemical stability. Part of this long term stability is due to the unexpected beneficial property that the aluminum chromate polymer solutions are self-buffering at the most advantageous pH range for using chromate rinses.

The aluminum chromate polymer is prepared by slowly adding aluminum hydroxide dried gel to a stirred hot chromic acid solution. From about ⅔ to about 2 moles of aluminum hydroxide dried gel are required for each mole of chromic acid in order to produce the desired polymer.

The concentration of the aluminum chromate polymer when used as a sealing rinse is the same as the prior art chromic acid sealing rinse expressed in terms of $CrO_3$ equivalent. This generally ranges from about 0.1 to about 20 grams per liter of $CrO_3$. The application temperature for the sealing rinse may vary from about ambient temperature to about 200°F. The time of contact can vary from about 2 seconds to about 1 hour.

After the aluminum polymer sealing rinses are applied to the phosphate coated metal, the metal may then be washed with water, preferably deionized water and then the metal is dried. Preferably, the metal wetted with the aluminum polymer sealing rinse is dried without any water rinse, or the metal wetted with the aluminum polymer sealing rinse is first dried, then rinsed with water, preferably deionized water and then redried. The latter two procedures give better underpaint corrosion resistance than the first procedure embodying the water rinse prior to drying. The drying of the rinsed panels is done by any conventional way currently employed in the metal treating industry. The drying temperatures are not critical and will vary from room temperature to about 180°F or higher as measured on the treated metal surfaces.

The phosphate coated metals which have been sealed with our aluminum chromate polymer rinse are then ready for the application of siccative organic coatings such as plastic coatings, paints, enamels and the like.

DETAILED DESCRIPTION OF THE INVENTION

The aluminum chromate polymer rinses of our invention are useful in sealing phosphate coatings on any metal substrate which carries a phosphate coating to increase resistance to corrosion and to enhance the bonding of paint or lacquer coatings. Generally, the substrate will be steel, galvanized steel, zink or aluminum. The metal substrates must be clean for application of the phosphating solutions and the metal surfaces are first cleaned by physical and/or chemical means well known in the art to remove surface dirt, grease or oxides.

The aluminum polymer sealing rinses of this invention are applicable to either the heavy-weight coating phosphates derived from aqueous zinc or manganese phosphate solutions or the light-weight phosphate coatings, generally called iron phosphate coatings, derived from aqueous solutions of acid sodium, potassium, and ammonium phosphates. The heavy-weight zinc phosphate coatings may be prepared and applied to steel, galvanized steel, zinc and aluminum metals as is disclosed in U.S. Pat. No. 3,203,835 and U.S. Pat. No. 3,619,300 and these patents are incorporated by reference. The use and application of the iron phosphate coatings to these metals are shown in U.S. Pat. No. 3,129,121 and U.S. Pat. No. 3,152,018 and these patents are incorporated by reference.

The phosphating solutions described above are applied by immersion, spraying, wiping and/or by roller coating as is well known in the art. After application of the phosphate coating, the coated metal is rinsed with water and then is contacted with the aluminum polymer sealing rinses our invention. If it is necessary to store the phosphate coated metal before sealing, it is preferable to dry the water rinsed metal by conventional methods.

The aluminum chromate polymer used as a sealing agent in this invention is prepared by adding aluminum hydroxide dried gel slowly and with agitation to a hot chromic acid solution. If the aluminum hydroxide dried gel is added too quickly to the acid solution; a basic salt of aluminum will precipitate and be lost since the basic aluminum chromates are insoluble.

The amount of aluminum hydroxide dried gel which is added to the aqueous chromic acid solution can range from about ⅔ of a mole to about 2 moles per mole of chromic acid. Amounts less than about two-thirds of a mole per mole of chromic acid will not result in the formation of the aluminum chromate polymer while amounts of the hydroxide gel greater than about two moles to one mole of acid lead to the formation of insoluble aluminum chromates such as $Al_2O_3 \cdot CrO_3 \cdot 7H_2O$, $3Al_2O_3 \cdot 2CrO_3 \cdot 6H_2O$ and $2Al_2O_3 \cdot CrO_3 \cdot 6H_2O$.

Temperatures during the addition of the aluminum hydroxide dried gel should be maintained within about 160°F to about 200°F and an external source of heat may be necessary. Agitation throughout the addition is required. As used throughout the specification and claims the term aluminum chromate polymer defines an aluminum chromate polymer composition prepared in the manner described above. The aluminum chromate polymer forms a clear viscous solution in water which can be dried to a clear glass form.

The concentration of the aluminum chromate polymer in the sealing rinse and the thickness of the aluminum chromate polymer coating on the metal surface will be the same as for the conventional chromic acid sealing rinse and coating as taught in U.S. Pat. No. 3,116,178 and U.S. Pat. No. 2,882,189 and the teachings of these patents are incorporated by reference. Generally, the concentration will vary from about 0.1 to about 20 grams per liter expressed as $CrO_3$. Higher amounts than 20 grams/liter can be used without any significant benefit in corrosion prevention or pain adhesion.

The aluminum chromate polymer may be sold as an aqueous acid concentrate which can be diluted with water for application to the phosphated metal substrate. These concentrates will contain from 20 to about 200 grams per liter of aluminum chromate polymer exposed as $CrO_3$.

The time of contact of the sealing rinse with the phosphated coated metal will vary with the temperature of the solution, the type of phosphate coating and the desired thickness of the aluminum chromate polymer coating. Contact time may vary from 2 seconds as in spraying to about 1 hour as by immersion. Coating weight will vary from as low as about 0.5 milligrams per square foot to as high as about 10 milligrams per square foot. Conventional wetting agents which are well known in the art can be used in the sealing rinse to facilitate wetting of the rinse with the phosphated surface.

The aluminum chromate polymer rinse is prepared by adding water to the aluminum chromate polymer while stirring. Deionized water is preferred. When first prepared, the aluminum chromate polymer rinse has a pH about 4.2. Its useful application range varies from a pH of about 3 to about 5. At a pH lower than 3 caused by acid drag in from a prior phosphating operation, the high acid concentration may dissolve the phosphate coating.

At a pH higher than about 5 the formation of insoluble basic aluminum chromates takes place and the bath must be discarded.

The bath stability of the aluminum chromate polymer over a wide pH range is one of its main advantages over the prior art chromate rinses. At the optimal pH range for chromate rinses, between 3.8 and 5.0, the chromi-chromate complex does not form a true solution, but rather a colloid dispersion. Slight contaminations of the rinse solution, either by drag-in or dissolution of small amounts of the phosphate coating, which is unavoidable under normal commercial operation conditions, will catalyze precipitation of chromium III compounds out of solution, with the effect not only of the loss of the beneficial chromi-chromates, but also of a severe drop of the pH to unacceptable low levels. Especially when the chromate rinse solution is heated, which is considered a more effectual application, the bath life might be only a few hours, after which the bath has to be dumped and a new bath has to be made up and for this reason, chromi-chromates are not much in use.

As compared to chromi-chromate rinses, the aluminum chromate polymer rinse of this invention is an improved chromate rinse with as good a performance after deionized water rinsing as chromi-chromates, but with none of the disadvantages of the latter. Not only is our compound much more stable against contaminations, even at boiling temperature, but, as an added feature, the product is self-buffering between pH's of 4 to 5 at normal use concentration, which enables the bath to perform much longer without maintenance. Conventional chromate rinses have to be checked and pH adjusted quite frequently, as often as two analyses every eight hours.

The temperature of the sealing rinse may vary from room temperature to boiling temperatures, that is, from about 70°F to about 212°F. Where the sealing rinse is to be dried on the phosphate coating without intermediate water rinse, a hot aluminum chromate polymer solution will leave a substantial amount of heat in the metal which will assist in the drying operation. Bath temperatures of about 130° to 150°F are generally encountered in the processing lines and this range is preferred.

The best manner of applying the aluminum chromate polymer sealing rinses is to contact the phosphate coated substrate with the sealing rinse, dry the metal wetted with aluminum polymer solution and finally rinse the phosphate coating which has been sealed with the aluminum chromate polymer solution with deionized water and then redry the metal. This manner of sealing the phosphate coatings gives the highest ratings in the salt spray and paint adhesion tests.

Another advantage of the aluminum chromate polymer coating is that it becomes chemically attached to the underlying phosphate coating and is not adversely affected by a water rinse if it is needed or desired. Deionized water is preferred over tap water for rinsing.

The best mode of carrying out our invention will be apparent from a consideration of the following examples:

EXAMPLE 1

A dilute solution of aluminum chromate was prepared according to the information in C.A. 36-4432-2. The solution was then heated to a boil to make it more concentrated. The initially bright orange solution changed the color to a more brownish orange tint at heating, which did not reverse back after cooling. Final concentration of chromates was 44 g/l $CrO_3$ equivalent. This concentrate was diluted to 0.47 g/l $CrO_3$ and adjusted with chromic acid to a pH of 3.5.

For comparison, a conventional proprietary chromate rinse, consisting mainly of calcium dichromate, and also a chromi-chromate rinse, having a ratio of $Cr^{III}/Cr^{VI} = 1:1.66$ were prepared to a concentration of 0.47 g/l $CrO_3$ equivalent. PH of the conventional rinse was 4.2, of the chromi-chromate rinse 3.5.

Mild steel panels (SAE 10/10) were cleaned in a proprietary hot soak alkaline cleaner, rinsed with water, and the three series of panels were coated with three different proprietary phosphate coating compounds.

A. A nitrite accelerated iron phosphate bath (Total Acidity — 10 points).
B. A nitrite accelerated zinc phosphate bath (Total Acidity — 15 points).
C. A chlorate accelerated zinc phosphate bath (Total Acidity — 15 points).

After coating, the panels were spray rinsed with tap water for 30 seconds and then spray rinsed for another 30 seconds with the chromate solutions. Following the chromate, one-half of the panels was rinsed immediately with deionized water, and then dried first for a few minutes at 200°F, the other half was dried first for a few minutes at 200°F, then rinsed with deionized water, then dried again. Some coated panels did not receive chromates as a control. The paint system consisted of one coat of a high bake alkyd enamel, applied by spray to all three phosphates.

After 24 hours of aging, the painted panels were subjected to humidity (100% at 100°F) and to salt spray (according to ASTM B117).

Result humidity: After 500 hours, all panels were unimpaired.

Result salt spray: Rating according to ASTM D1654 (240 hours, 90°F, 5% salt fog). (Rating from 0 to 10. 0 = more than 1 inch creep from scribe mark. 10 = no creep at all.)

| Phosphate Coating | Chromate Rinse | Alkyd Enamel | |
|---|---|---|---|
| | | Chromate Rinsed Immediately with $H_2O$ | Chromate Dried on First then $H_2O$ Rinsed |
| Iron Phosphate | None (Control) | 0 | — |
| | Calcium Dichromates | 0 | 3.5 |
| | Chromi Chromates | 2.0 | 8.5 |
| | Aluminum Chromate Polymer | 3.0 | 8.5 |
| Zinc Phosphate Nitrite Accelerator | None (Control) | 5.0 | — |
| | Calcium Dichromates | 5.0 | 5.0 |
| | Chromi Chromates | 6.0 | 7.5 |
| | Aluminum Chromate Polymer | 5.0 | 7.0 |
| Zinc Phosphate Chlorate Accelerator | None (Control) | 5.5 | — |
| | Calcium Dichromate | 5.5 | 6.0 |
| | Chromi Chromates | 8.0 | 9.5 |
| | Aluminum Chromate Polymer | 6.5 | 9.0 |

EXAMPLE 2

100 grams of chromic acid were dissolved in 800 grams of deionized water and heated to near boiling. To the hot acid solution, 58.7 grams of aluminum hydroxide dried gel (58.1% $Al_2O_3$) obtained from Chattem Chemical Co. were added slowly under steady stirring. Within 30 minutes the aluminum hydroxide dried gel was completely dissolved. After cooling, deionized water was added to bring the volume of the aluminum chromate polymer concentrate to 1 liter.

This concentrated solution was diluted with deionized water to a concentration of 0.47 g/l $CrO_3$. The pH at make-up was 4.3.

SAE 10/10 mild steel panels were cleaned as in Example 1 and coated with the phosphate coating baths A and B, from Example 1. After coating and water rinsing, the panels were immersed for 30 seconds in the aluminum chromate solution, respectively in the proprietary chromate rinses of Example 1. One-third of the panels were rinsed immediately with deionized water after chromate rinsing, the second third was dried on first and then water rinsed, the last third was not water rinsed after the chromate application. Some panels did not receive chromates as a control.

The panels were painted with one coat of the high bake alkyd enamel of Example 1 and then subjected to humidity and salt spray exposure as before.

Result humidity: ASTM D714 (3 weeks exposure)
10 denotes a perfect score, lower number indicate blisters according to the ASTM photographic standard (lower numbers bigger blisters).

| Phosphate Coating | Chromate Rinse | Chromate Rinsed Immediately | Chromate Rinsed After Drying | Chromate Not Rinsed |
|---|---|---|---|---|
| Iron Phosphate | None (control) | Few 8–9 | — | — |
| | Calcium dichromates | Few 8–9 | 10 | 10 |
| | Aluminum chromate polymer | 10 | 10 | 10 |
| Zinc Phosphate | None (control) | Few 9 | — | — |
| | Calcium dichromates | Few 9 | 10 | 10 |
| | Aluminum chromate polymer | 10 | 10 | 10 |

Result salt spray: Rating according to ASTM D1654 (240 hours, 95°F, 5% salt fog).

-Continued

| Phosphate Coating | Chromate Rinse | Chromate Rinsed Immediately | Chromate Rinsed After Drying | Chromate Not Rinsed |
| --- | --- | --- | --- | --- |
| Iron Phosphate | None (control) | 0 | — | — |
| | Calcium di-chromates | 3.5 | 7.5 | 7.5 |
| | Aluminum chromate polymer | 6.5 | 7.5 | 7.5 |
| Zinc Phosphate | None (control) | 5.0 | — | — |
| | Calcium di-chromates | 5.0 | 6.0- | 7.0 |
| | Aluminum chromate polymer | 6.5 | 7.0 | 7.0 |

EXAMPLE 3

In commercial operations, conventional chromate rinses, such as the proprietary calcium dichromates containing rinse used in Examples 1 and 2, increase their pH in use, sometimes quite rapidly, depending on hardness and alkalinity of the make-up water. Especially when the rinse is used hot, the water lost by evaporation has to be replaced constantly, thus introducing more and more calcium, magnesium and sodium carbonates into the rinse with the adverse effect on the pH. Therefore, the results we obtained with the calcium dichromate rinse in our examples are optimal results, realized in the field only if a very close control is kept, which is mostly not the case. The aluminum chromate polymer of our invention is much more stable to alkali additions and even somewhat more stable against acids in the hypothetical case when the acid phosphate coating bath is not rinsed completely off the coated goods. To demonstrate this, solutions of the conventional rinse and the aluminum chromate polymer rinse have been titrated with 1/10N sodium hydroxide respectively. 1/10N hydrochloric acid and the pH has been monitored with an electronic pH meter.

Concentration: 0.47 g/l $CrO_3$ equivalent for both rinses.
Amount of rinse: 1 liter

| ml 1/10N NaOH added | pH Calcium Dichromate Rinse | pH Aluminum Chromate Polymer Rinse | ml 1/10N HCl added | pH Calcium Dichromate Rinse | pH Aluminum Chromate Polymer Rinse |
| --- | --- | --- | --- | --- | --- |
| 0 | 3.70 | 4.25 | 0 | 3.70 | 4.25 |
| 1 | 4.00 | 4.25 | 1 | 3.50 | 4.20 |
| 2 | 4.50 | 4.25 | 2 | 3.40 | 4.15 |
| 4 | 4.75 | 4.27 | 5 | 3.15 | 3.90 |
| 5 | 5.37 | 4.28 | 10 | 2.90 | 3.15 |
| 10 | 5.80 | 4.32 | | | |
| 15 | 6.10 | 4.37 | | | |
| 20 | 6.30 | 4.40 | | | |
| 30 | 6.60 | 4.55 | | | |
| 40 | 7.10 | 5.20 | | | |
| 52 | 10.00 | 6.20 | | | |

We claim:

1. The process of sealing a phosphate coated metal comprising wetting the phosphate coated metal by contacting it with an acidic aqueous solution consisting essentially of aluminum chromate polymer in which solution the concentration of the aluminum chromate polymer is at least 0.1 grams per liter expressed as $CrO_3$, rinsing the wetted metal with deionized water and then drying the said metal.

2. The process of claim 1 in which the concentration of the aluminum chromate polymer ranges from about 0.1 to about 20 grams per liter.

3. The process of claim 2 in which the pH of the aqueous solution of the aluminum chromate polymer ranges from about 3 to about 5.

4. The process of claim 3 in which the phosphate coated metal is in contact with the aqueous solution of aluminum chromate polymer for a time ranging from about 2 seconds to about 1 hour.

5. The process of claim 4 in which the phosphate coated metal is selected from the group consisting of steel, galvanized steel, zinc and aluminum.

6. The process of claim 4 in which the temperature of the aqueous solution of the aluminum chromate polymer ranges from about room temperature to about 200°F.

7. The process of claim 5 in which steel is coated with a zinc phosphate coating.

8. The process of claim 5 in which steel is coated with an iron phosphate coating.

9. The process of sealing a phosphate coated metal comprising wetting the phosphate coated metal by contacting it with an acidic aqueous solution consisting essentially of aluminum chromate polymer in which solution the concentration of the aluminum chromate polymer is at least 0.1 grams per liter expressed as $CrO_3$, drying the wetted metal without rinsing, rinsing the dried metal with deionized water and then redrying the metal.

10. The process of sealing a phosphate coated metal comprising wetting the phosphate coated metal by contacting it with an acidic aqueous solution consisting essentially of aluminum chromate polymer in which solution the concentration of the aluminum chromate polymer is at least 0.1 grams per liter expressed as $CrO_3$ and then drying the wetted metal without rinsing.

11. The process of claim 10 in which the concentration of the aluminum chromate polymer ranges from about 0.1 to about 20 grams per liter of $CrO_3$.

12. The process of claim 11 in which the pH of the aqueous solution of the aluminum chromate polymer ranges from about 3 to about 5.

13. The process of claim 12 in which the phosphate coated metal is in contact with the aqueous solution of aluminum chromate polymer for a time ranging from about 2 seconds to about 1 hour.

14. The process of claim 13 in which the phosphate coated metal is selected from the group consisting of steel, galvanized steel, zinc and aluminum.

15. The process of claim 13 in which the temperature of the aqueous solution of the aluminum chromate polymer ranges from about room temperature to about 200°F.

16. the process of claim 14 in which steel is coated with a zinc phosphate coating.

17. The process of claim 14 in which steel is coated with an iron phosphate coating.

* * * * *